US009416679B2

(12) United States Patent
Black

(10) Patent No.: US 9,416,679 B2
(45) Date of Patent: Aug. 16, 2016

(54) BORESCOPE ASSEMBLY AND METHOD OF INSTALLING BORESCOPE PLUGS

(71) Applicant: General Electric Company, Schenectady, NY (US)

(72) Inventor: Kenneth Damon Black, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 13/961,257

(22) Filed: Aug. 7, 2013

(65) Prior Publication Data

US 2015/0040581 A1 Feb. 12, 2015

(51) Int. Cl.
*F02C 7/00* (2006.01)
*F01D 21/00* (2006.01)
*F01D 25/00* (2006.01)
*G02B 23/24* (2006.01)

(52) U.S. Cl.
CPC .............. *F01D 21/003* (2013.01); *F01D 25/00* (2013.01); *F02C 7/00* (2013.01); *G02B 23/2476* (2013.01); *F05D 2250/11* (2013.01); *F05D 2250/12* (2013.01); *F05D 2250/121* (2013.01); *F05D 2250/131* (2013.01); *F05D 2250/132* (2013.01); *F05D 2250/23* (2013.01); *F05D 2250/231* (2013.01); *F05D 2260/80* (2013.01)

(58) Field of Classification Search
CPC ....... F01D 21/003; F01D 25/00; F01D 17/02; F02C 7/00; G02B 23/2476; F05D 2250/11; F05D 2250/12; F05D 2250/131; F05D 2250/132; F05D 2250/23; F05D 2250/231; F05D 2260/80; F05D 2270/80; F05D 2250/13; F05D 2250/121

USPC .................. 60/803, 796, 797, 798, 799, 800; 415/118, 201; 356/241.1; 416/61

See application file for complete search history.

(56) References Cited

U.S. PATENT DOCUMENTS

| | | | |
|---|---|---|---|
| 741,903 A | 10/1903 | Gates | |
| 2,965,286 A * | 12/1960 | Ledwith | F04D 29/522 415/190 |
| 3,778,170 A | 12/1973 | Howell et al. | |
| 3,917,432 A | 11/1975 | Feuerstein et al. | |
| 4,011,017 A | 3/1977 | Feuerstein et al. | |
| 4,149,717 A | 4/1979 | Seijiro | |
| 4,668,162 A * | 5/1987 | Cederwall | B23B 51/048 415/115 |
| 4,815,276 A | 3/1989 | Hansel et al. | |
| 5,047,848 A | 9/1991 | Krauter | |
| 5,115,636 A | 5/1992 | Zeiser | |
| 5,152,662 A | 10/1992 | Hirst et al. | |
| 5,431,534 A * | 7/1995 | Charbonnel | F01D 21/003 415/118 |
| 5,674,103 A | 10/1997 | Bean | |
| 5,867,976 A | 2/1999 | Ziegler, Jr. | |
| 6,468,033 B1 | 10/2002 | Weidlich | |
| 7,458,768 B2 | 12/2008 | Dube et al. | |
| 8,047,769 B2 * | 11/2011 | Ballard, Jr. | F01D 17/02 415/118 |
| 2010/0215477 A1 | 8/2010 | Wilson | |
| 2011/0076134 A1 * | 3/2011 | Tommasone | F01D 21/003 415/118 |

* cited by examiner

*Primary Examiner* — Steven Sutherland
(74) *Attorney, Agent, or Firm* — Ernest G. Cusick; Frank A. Landgraff

(57) ABSTRACT

A borescope assembly includes a first borescope plug comprising a first perimeter geometry portion. Also included is a second borescope plug comprising a second perimeter geometry portion distinct from the first perimeter geometry portion. Further included is a first borescope hole comprising a first hole geometry portion corresponding to the first perimeter geometry portion of the first borescope plug. Yet further included is a second borescope hole comprising a second hole geometry portion corresponding to the second perimeter geometry portion of the second borescope plug.

19 Claims, 4 Drawing Sheets

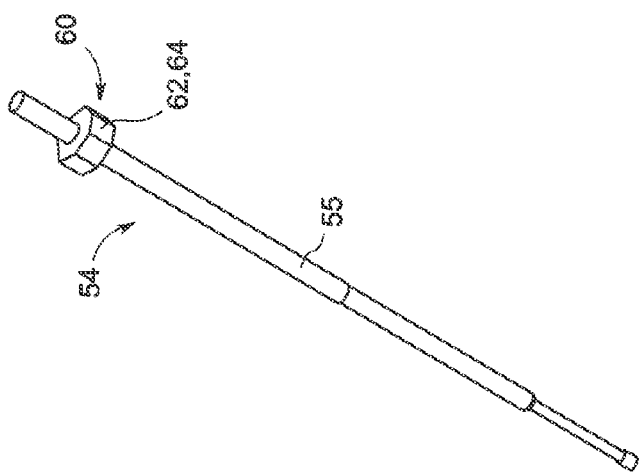
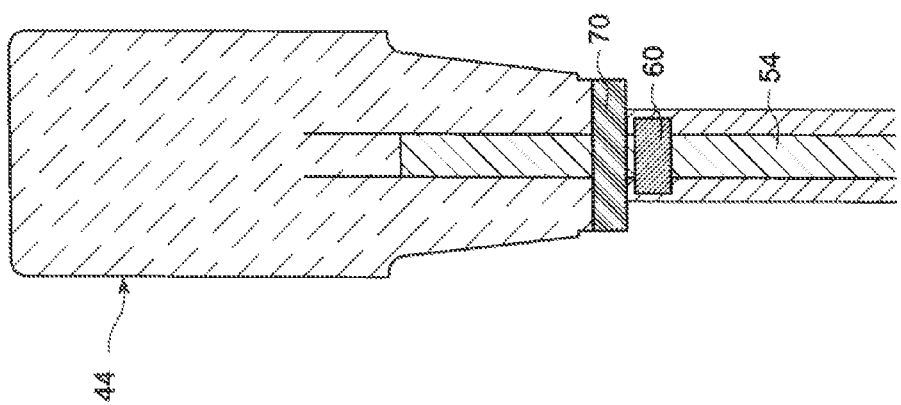

BORESCOPE ASSEMBLY AND METHOD OF INSTALLING BORESCOPE PLUGS

BACKGROUND OF THE INVENTION

The subject matter disclosed herein relates to borescope assemblies, such as those used in turbine assemblies, as well as a method of installing borescope plugs.

Borescopes are used to visually inspect internal components of turbine assemblies, such as gas turbine engines, for example. They are typically inserted through borescope holes placed in locations of a static structure that lead to internal locations of interest. Such insertion occurs during an outage. When the turbine assembly is in operation, the borescope holes must be plugged and sealed to reduce or prevent hot gases from being emitted from the turbine which would result in overall system performance and/or safety issues. Plugging of the holes is done with a borescope plug. Typically, the borescope holes are similar in diameter, but vary in length. Similarly, the borescope plugs to be inserted into the borescope holes are similar in diameter, but vary in length. Maintenance personnel must use caution to ensure that a borescope plug of a given length is not inserted into a borescope hole with a distinct length. Incorrect insertion may create a leak path due to the fact that a short plug has a tendency to seal improperly. Additionally, incorrect insertion may impose a situation where a long borescope plug (relative to the borescope hole) is bent during insertion. This incorrect assembly condition may also result in leakages, disassembly issues, and delays during an outage.

BRIEF DESCRIPTION OF THE INVENTION

According to one aspect of the invention, a borescope assembly includes a first borescope plug comprising a first perimeter geometry portion. Also included is a second borescope plug comprising a second perimeter geometry portion distinct from the first perimeter geometry portion. Further included is a first borescope hole comprising a first hole geometry portion corresponding to the first perimeter geometry portion of the first borescope plug. Yet further included is a second borescope hole comprising a second hole geometry portion corresponding to the second perimeter geometry portion of the second borescope plug.

According to another aspect of the invention, a borescope assembly for a turbine assembly includes a plurality of borescope plugs each including a main plug portion and a collar disposed along the main plug portion, wherein the collar of each of the plurality of borescope plugs comprises a perimeter geometry distinct from the perimeter geometry of the remaining collars. Also included is a plurality of borescope holes each comprising a hole geometry corresponding to the perimeter geometry of the collar of one of the plurality of borescope plugs.

According to yet another aspect of the invention, a gas turbine engine includes a compressor, a combustor assembly, a turbine, and a borescope assembly. The borescope assembly includes a first borescope plug comprising a first perimeter geometry portion. The borescope assembly also includes a second borescope plug comprising a second perimeter geometry portion distinct from the first perimeter geometry portion. The borescope assembly further includes a first borescope hole comprising a first hole geometry portion corresponding to the first perimeter geometry portion of the first borescope plug. The borescope assembly yet further includes a second borescope hole comprising a second hole geometry portion corresponding to the second perimeter geometry portion of the second borescope plug.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a cross-sectional view of a borescope assembly;

FIG. 4 is a borescope plug of the borescope assembly;

The detailed description explains embodiments of the invention, together with advantages and features, by way of example with reference to the drawings.

DETAILED DESCRIPTION OF THE INVENTION

Figure 1:
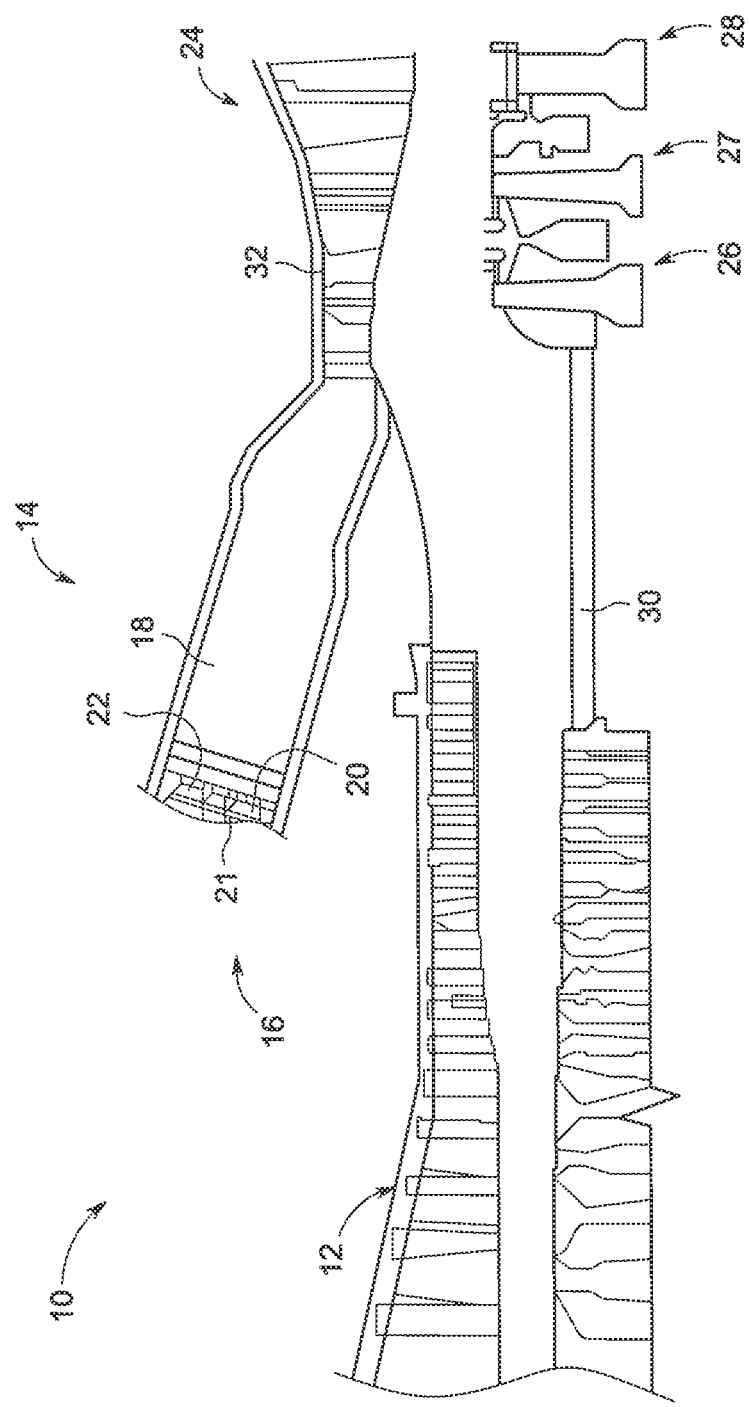
FIG. 1 is a schematic illustration of a turbine assembly.

Referring to FIG. 1, a turbine assembly, such as a gas turbine engine 10 constructed in accordance with an exemplary embodiment of the invention, is schematically illustrated. The gas turbine engine 10 includes a compressor section 12 and a plurality of combustor assemblies arranged in a can annular array, one of which is indicated at 14. As shown, the combustor 14 includes an endcover assembly 16 that seals, and at least partially defines, a combustion section 18. In one embodiment, a plurality of nozzles 20-22 is supported by the endcover assembly 16 and extends into the combustion section 18. The nozzles 20-22 receive fuel through a common fuel inlet (not shown) and compressed air from the compressor section 12. It should be appreciated that this invention is independent of the details of the combustion system, and the can annular system is referenced for purposes of discussion. The fuel and compressed air are passed into the combustion section 18 and ignited to form a high temperature, high pressure combustion product or air stream that is used to drive a turbine section 24. The turbine section 24 includes a plurality of stages 26-28 that are surrounded by a casing 32 and operationally connected to the compressor section 12 through a compressor/turbine shaft 30 (also referred to as a rotor).

In operation, air flows into the compressor section 12 and is compressed into a high pressure gas. The high pressure gas is supplied to the combustor 14 and mixed with fuel, for example natural gas, fuel oil, process gas and/or synthetic gas (syngas), in the combustion section 18. The fuel-air or combustible mixture ignites to form a high pressure, high temperature combustion gas stream. In any event, the combustor 14 channels the combustion gas stream to the turbine section 24 which converts thermal energy to mechanical, rotational energy.

Figure 2:
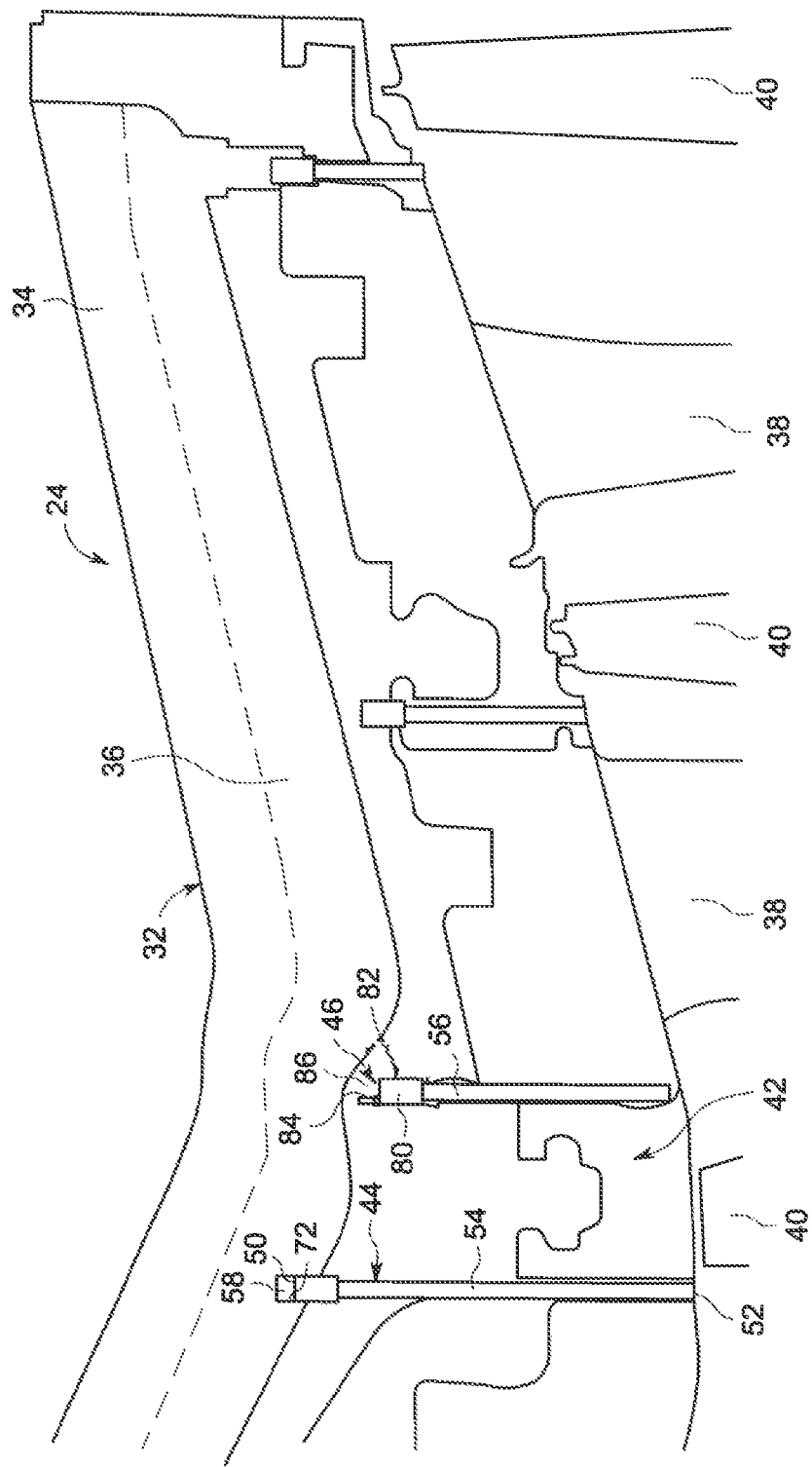
FIG. 2 is a schematic illustration of a turbine section of the turbine assembly.

Referring to FIG. 2, the casing 32 of the turbine section 24 is illustrated in greater detail. The casing 32 generally refers to a structure that surrounds and at least partially defines an internal region of the turbine section 24. The casing 32 may be a unitary structure or may be formed of multiple segments, such as a double casing that comprises an outer casing 34 and an inner casing 36, which are operatively coupled to each other. As shown, internal components of the turbine section 24 include a plurality of nozzle vanes 38 and rotor buckets 40, for example. The internal components are surrounded by the casing 32, as noted above, as well as at least one shroud 42 in the illustrated embodiment.

A plurality of borescope plugs 44 are disposed within a plurality of borescope holes 46 that extend through the at least one shroud 42 or through a nozzle outer side wall, as shown. Although shown and described as extending through the at least one shroud 42, it is to be appreciated in certain embodiments, the plurality of borescope holes 46 extend through the casing 32, or alternatively through the casing 32 and the at least one shroud 42 in combination. Regardless, it is to be understood that the plurality of borescope holes 46 extend through an outer structure to provide access for a borescope, or other inspection device, that may be employed to monitor internal components of the turbine section 24. Although the location of the plurality of borescope holes 46 described herein are discussed in conjunction with the turbine section 24, any portion of the gas turbine engine 10 may benefit from the use of the embodiments described herein. For example, the compressor section 12 may include the plurality of borescope holes 46 that require plugging during operation of the gas turbine engine 10.

Each of the plurality of borescope holes 46 are typically of varying lengths, as they are positioned at distinct axial locations throughout the turbine section 24. The plurality of borescope holes 46 may be of similar diameter or perimeter, however, varying diameters and perimeter are contemplated. In order to seal the plurality of borescope holes 46 during operation of the gas turbine engine 10, the plurality of borescope plugs 44 are inserted into the plurality of borescope holes 46. As noted above, the plurality of borescope holes 46 extend through the casing 32 and/or the at least one shroud 42 from a first end 50 to a second end 52, with the second end 52 exposing the internal region of the turbine section 24 that is to be inspected. A varying number of borescope holes may be included, depending on the particular application. In the exemplary embodiment, four borescope holes and associated borescope plugs are illustrated, but more or less are contemplated. For purposes of discussion, a first borescope plug 54 and a second borescope plug 56 are specifically labeled.

Figure 5:
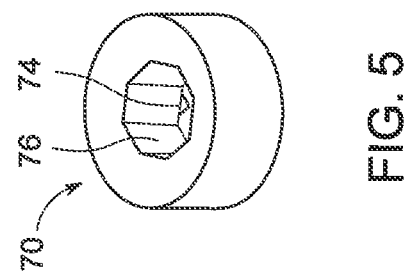
FIG. 5 is a collar of the borescope plug.

Referring now to FIGS. 3-5, in conjunction with FIG. 2, the first borescope plug 54 and a first borescope hole 58 are illustrated in greater detail. The first borescope hole 58 extends through an outer static structure, such as the at least one shroud 42 and the first borescope plug 54 is disposed therein. In order to ensure that the proper borescope plug is being inserted into the first borescope hole 58, uniquely shaped features are included in the overall assembly. Specifically, the first borescope plug 54 comprises a first main plug portion 55 that is typically cylindrical, but alternative cross-sectional geometries are contemplated. A collar 60 is integrally formed with, or operatively coupled to, the first main plug portion 55. An outer surface 62 of the collar 60 comprises a first perimeter geometry portion 64. A first insert 70 is integrally formed with, or operatively coupled to, a hole wall 72 of the first borescope hole 58. The first insert 70 includes a cutout portion 74 that defines a first hole geometry portion 76. The first hole geometry portion 76 and the first perimeter geometry portion 64 correspond to one another, such that it is only possible for a borescope plug having the collar 60 with the first perimeter geometry portion 64 to be inserted through the cutout portion 74 of the first insert 70. Collars having a distinct perimeter geometry, with respect to the first hole geometry portion 76 of the cutout portion 74, are unable to pass through the cutout portion 74 of the first insert 70 based on the mismatched geometries, thereby reducing or preventing the ability of a borescope plug other than the first borescope plug 54 to be inserted into the first borescope hole 58. For example, the second borescope plug 56 (FIG. 2) is shorter than the first borescope plug 54 and would ineffectively seal the first borescope hole 58. Therefore, the second borescope plug 56 comprises a second collar 80 with a second perimeter geometry portion 82 that corresponds to a second hole geometry portion 84 of a second borescope hole 86. The distinct geometries prohibit insertion of the first borescope plug 54 into the second borescope hole 86. Conversely, the second borescope plug 56 is unable to be inserted into the first borescope hole 58.

Figure 6:
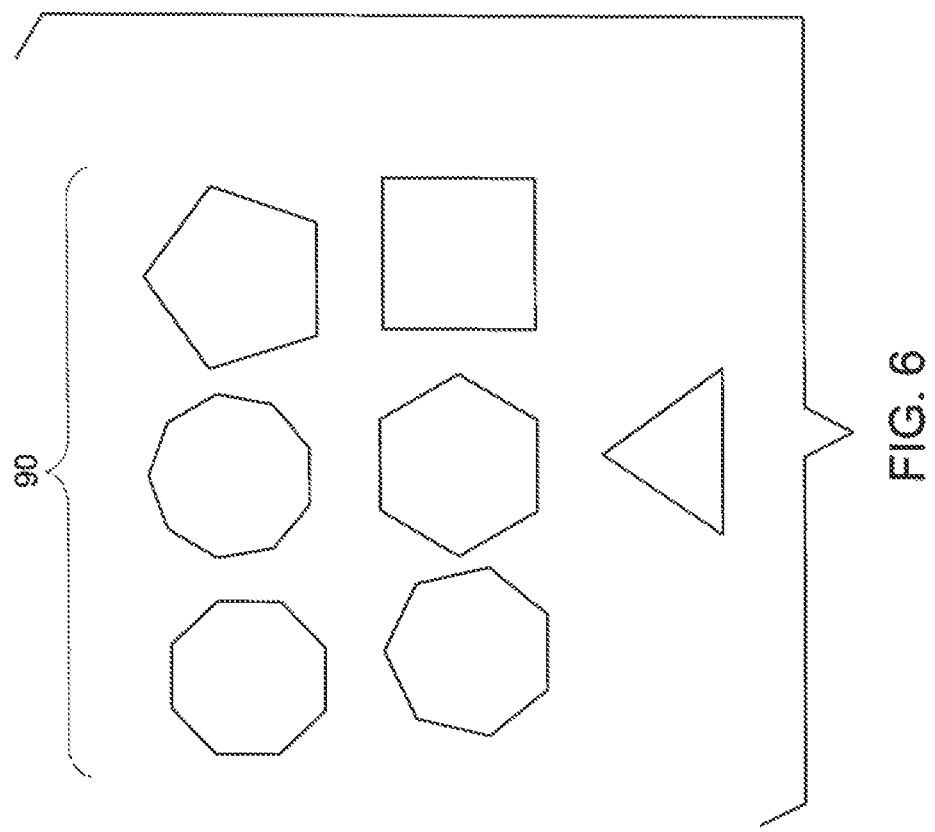
FIG. 6 is a plurality of exemplary geometries used in conjunction with the borescope assembly.

Any number of contemplated geometries may be employed for the borescope plugs and the borescope holes. In one embodiment, the geometries are polygons 90 (FIG. 6) and can range in the number of sides that define the polygons. For example, polygons with sides ranging from three to nine, however, polygons, with more sides may be suitable. The specific geometry employed may vary. The important aspect relates to the principle that each borescope plug includes a distinct outer geometry portion that corresponds to a particular borescope hole geometry.

The distinct geometry portion of the respective borescope plugs and borescope holes refers to a portion of the borescope plugs and borescope holes that include the specific geometries. In the embodiments described above and illustrated, inserts are employed with cutout portions. The collars of the borescope plugs must pass through the cutout portions to become fully inserted into the borescope holes. The inserts and the collars may be operatively coupled to, or integrally formed with, the plurality of borescope holes 46 and the plurality of borescope plugs 44, respectively. In alternative embodiments, the distinct geometries may be the borescope hole geometry and/or the borescope plug geometry. In other words, the plurality of borescope plugs 44 and/or the plurality of borescope holes 46 may comprise the distinct geometries necessary for proper insertion of the plugs into the holes.

In operation, each of the plurality of borescope plugs 44 is inserted into one of the plurality of borescope holes 46. To fully insert the borescope plug into the correct borescope hole, a perimeter geometry portion of the borescope plug must fit and slide along and/or through a hole geometry portion of the borescope hole. Use of the distinct geometries reduces the likelihood that insertion of an incorrect borescope plug is inserted into one of the borescope holes, thereby advantageously providing proper sealing of the plurality of borescope holes 46 and avoiding damage to the plugs and/or internal components of the turbine section 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A borescope assembly comprising:
a first borescope plug comprising a first perimeter geometry portion;

a second borescope plug comprising a second perimeter geometry portion distinct from the first perimeter geometry portion;

a first borescope hole comprising a first hole geometry portion corresponding to the first perimeter geometry portion of the first borescope plug; and a second borescope hole comprising a second hole geometry portion corresponding to the second perimeter geometry portion of the second borescope plug, wherein the first perimeter geometry portion and the first hole geometry portion comprise a polygon.

2. The borescope assembly of claim 1, wherein the polygon is defined by at least three sides.

3. The borescope assembly of claim 1, wherein the borescope assembly is disposed in a gas turbine assembly.

4. The borescope assembly of claim 1, wherein distinct geometries of the first borescope plug and the second borescope plug prohibit insertion of the first borescope plug into the second borescope hole.

5. The borescope assembly of claim 1, further comprising a first collar located along the first borescope plug and a second collar located along the second borescope plug, the first collar defining the first perimeter geometry portion and the second collar defining the second perimeter geometry portion.

6. The borescope assembly of claim 5, wherein the first collar is integrally formed with the first borescope plug.

7. The borescope assembly of claim 5, wherein the first collar is operatively coupled to the first borescope plug.

8. The borescope assembly of claim 1, further comprising a first insert disposed within the first borescope hole and having a cutout portion defining the first hole geometry portion.

9. The borescope assembly of claim 8, wherein the first insert is integrally formed within the first borescope hole.

10. The borescope assembly of claim 8, wherein the first insert is operatively coupled to a hole wall of the first borescope hole.

11. A borescope assembly for a turbine assembly comprising:

a plurality of borescope plugs each including a main plug portion and a collar disposed along the main plug portion, wherein the collar of each of the plurality of borescope plugs comprises a perimeter geometry distinct from the perimeter geometry of the remaining collars; and a plurality of borescope holes each comprising a hole geometry corresponding to the perimeter geometry of the collar of one of the plurality of borescope plugs, wherein the perimeter geometry comprises a polygon.

12. The borescope assembly of claim 11, wherein the polygon is defined by at least three sides.

13. The borescope assembly of claim 11, wherein distinct geometries of the first borescope plug and the second borescope plug prohibit insertion of the first borescope plug into the second borescope hole.

14. The borescope assembly of claim 11, wherein the collar is integrally formed with the main plug portion.

15. The borescope assembly of claim 11, wherein the collar is operatively coupled to the main plug portion.

16. The borescope assembly of claim 11, further comprising an insert disposed within each of the plurality of borescope holes.

17. The borescope assembly of claim 16, wherein the insert comprises a cutout portion defining the hole geometry of each of the plurality of borescope holes.

18. The borescope assembly of claim 16, wherein the insert is integrally formed within each of the plurality of borescope holes.

19. The borescope assembly of claim 16, wherein the insert is operatively coupled to a hole wall of each of the plurality of borescope holes.

* * * * *